E. DISINGER.
MACHINE FOR CASTING STRIPS TO STORAGE BATTERY GRIDS.
APPLICATION FILED JUNE 19, 1916.

1,344,294.

Patented June 22, 1920.
5 SHEETS—SHEET 1.

Inventor:
Ernest Disinger
by Thurston & Kwis
Attys.

E. DISINGER.
MACHINE FOR CASTING STRIPS TO STORAGE BATTERY GRIDS.
APPLICATION FILED JUNE 19, 1916.

1,344,294.

Patented June 22, 1920.
5 SHEETS—SHEET 2.

Inventor:
Ernest Disinger
by Thurston & Kwis
Attys.

E. DISINGER.
MACHINE FOR CASTING STRIPS TO STORAGE BATTERY GRIDS.
APPLICATION FILED JUNE 19, 1916.

1,344,294.

Patented June 22, 1920.

5 SHEETS—SHEET 3.

E. DISINGER.
MACHINE FOR CASTING STRIPS TO STORAGE BATTERY GRIDS.
APPLICATION FILED JUNE 19, 1916.
1,344,294.
Patented June 22, 1920.
5 SHEETS—SHEET 4.
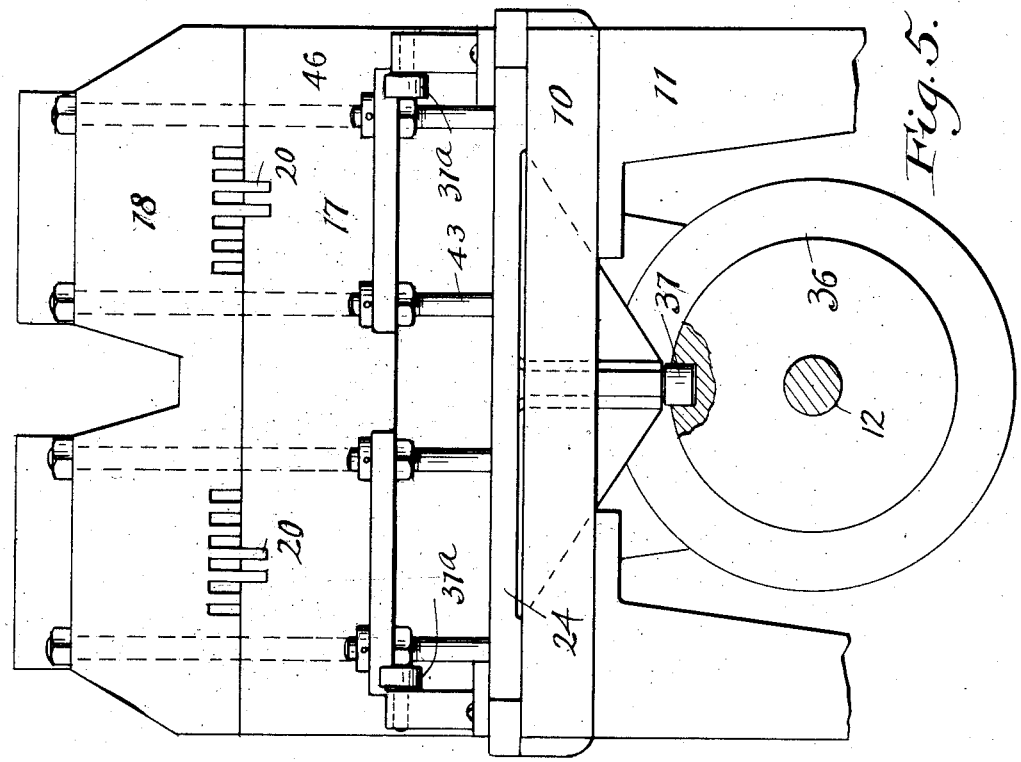
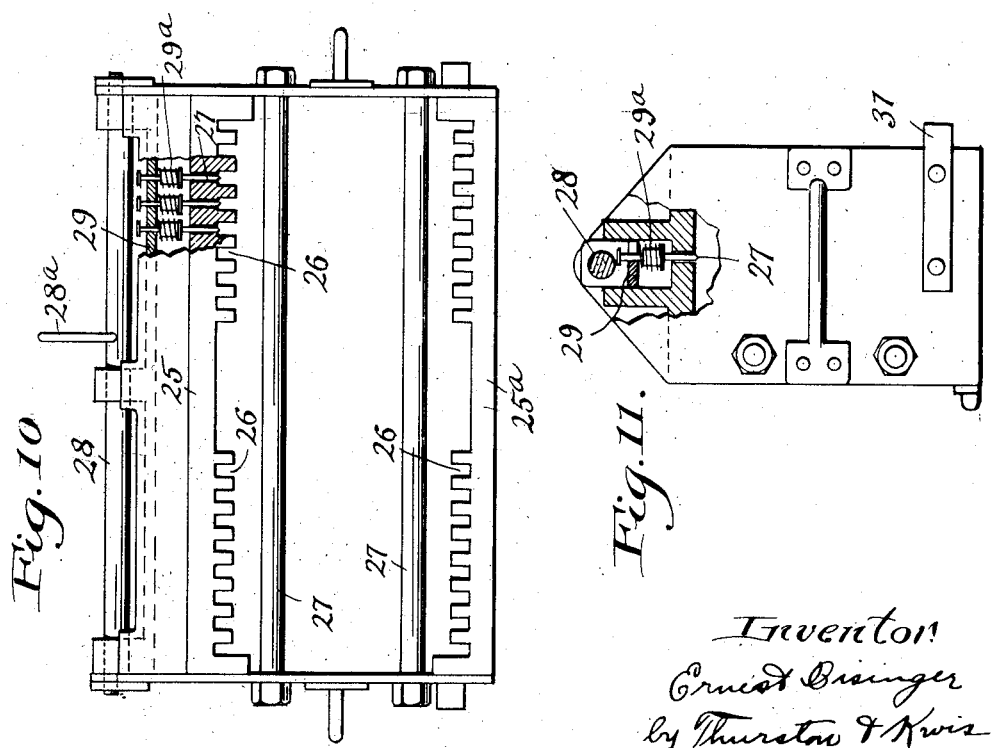
Inventor
Ernest Disinger
by Thurston & Kwis E. DISINGER.
MACHINE FOR CASTING STRIPS TO STORAGE BATTERY GRIDS.
APPLICATION FILED JUNE 19, 1916.

1,344,294.

Patented June 22, 1920.
5 SHEETS—SHEET 5.

Inventor
Ernest Disinger
by Thurston & Kwis
Attys

UNITED STATES PATENT OFFICE.

ERNEST DISINGER, OF CLEVELAND, OHIO, ASSIGNOR TO WILLARD STORAGE BATTERY COMPANY, OF CLEVELAND, OHIO, A CORPORATION OF WEST VIRGINIA.

MACHINE FOR CASTING STRIPS TO STORAGE-BATTERY GRIDS.

1,344,294.   Specification of Letters Patent.   Patented June 22, 1920.

Application filed June 19, 1916. Serial No. 104,363.

*To all whom it may concern:*

Be it known that I, ERNEST DISINGER, a citizen of the United States, residing at Cleveland, in the county of Cuyahoga and State of Ohio, have invented a certain new and useful Improvement in Machines for Casting Strips to Storage-Battery Grids, of which the following is a full, clear, and exact description.

This invention relates to a casting machine adapted particularly for casting straps and terminal posts to storage battery grids. The subject matter of this application constitutes an improvement over the casting machine described in my prior application, Serial No. 812,033, filed January 14, 1914.

The object of the present invention is to provide certain improvements which render the machine more efficient, convenient and satisfactory in use, and enable straps and terminal posts to be cast onto groups of battery plates more rapidly than with the machine constituting the subject matter of my prior application.

The invention may be briefly summarized as consisting in certain novel details of construction and combinations and arrangements of parts which will be described in the specification, and set forth in the appended claims.

Figure 1:
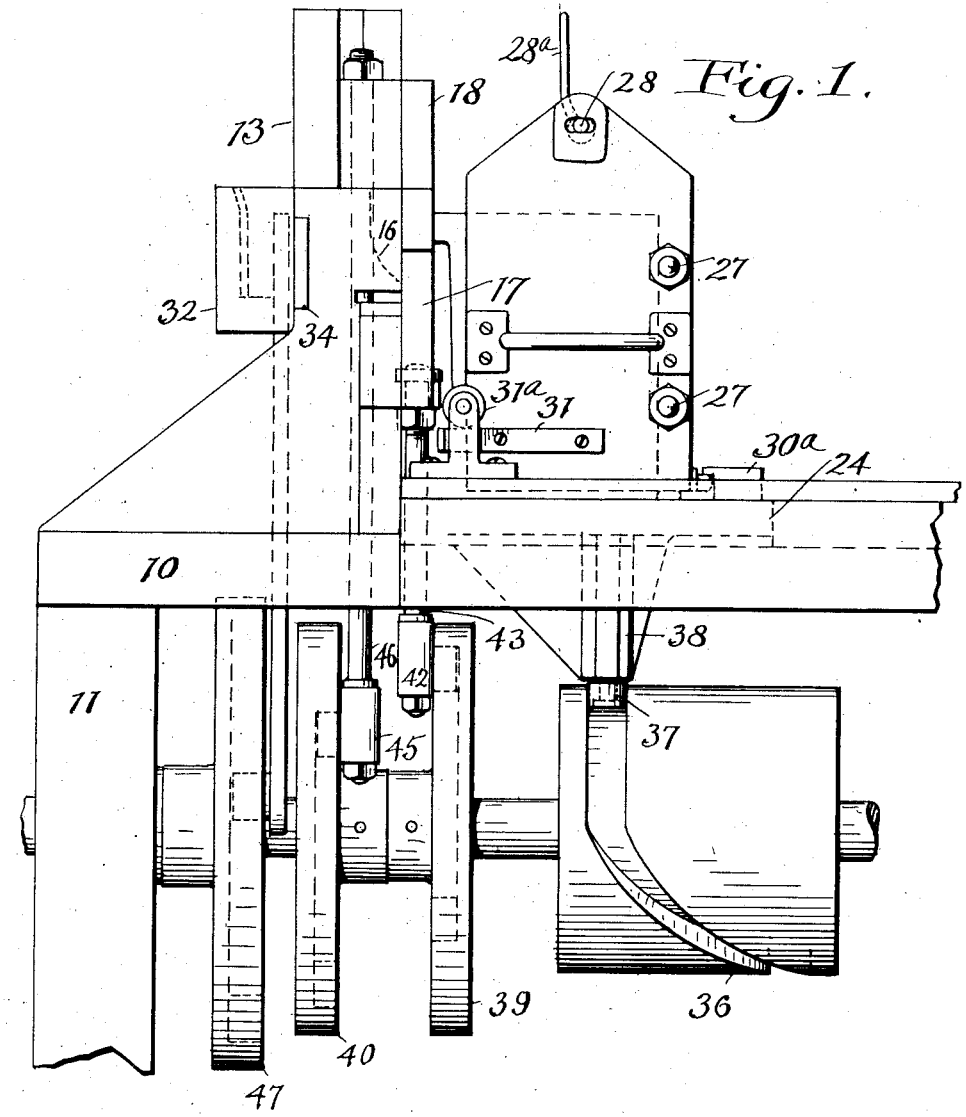
Figure 8:
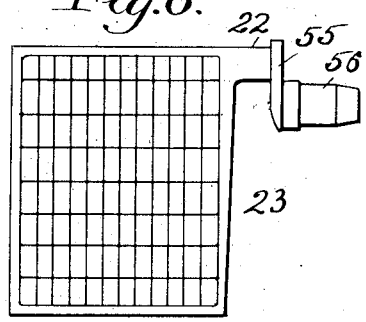
Figure 9:
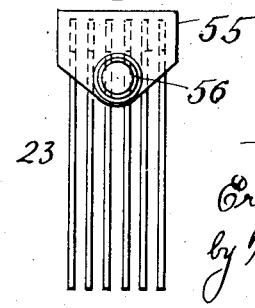
Figure 2:
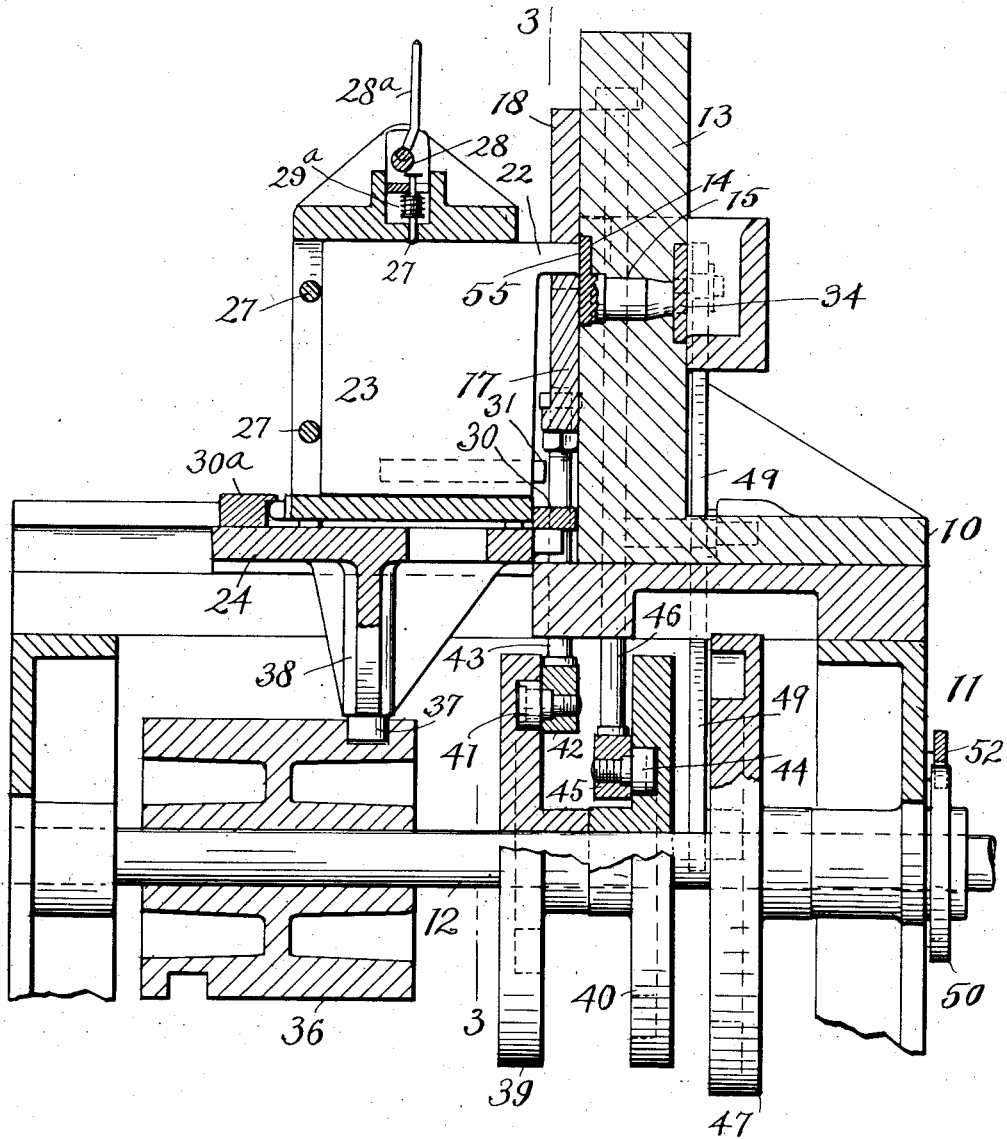
Figure 3:
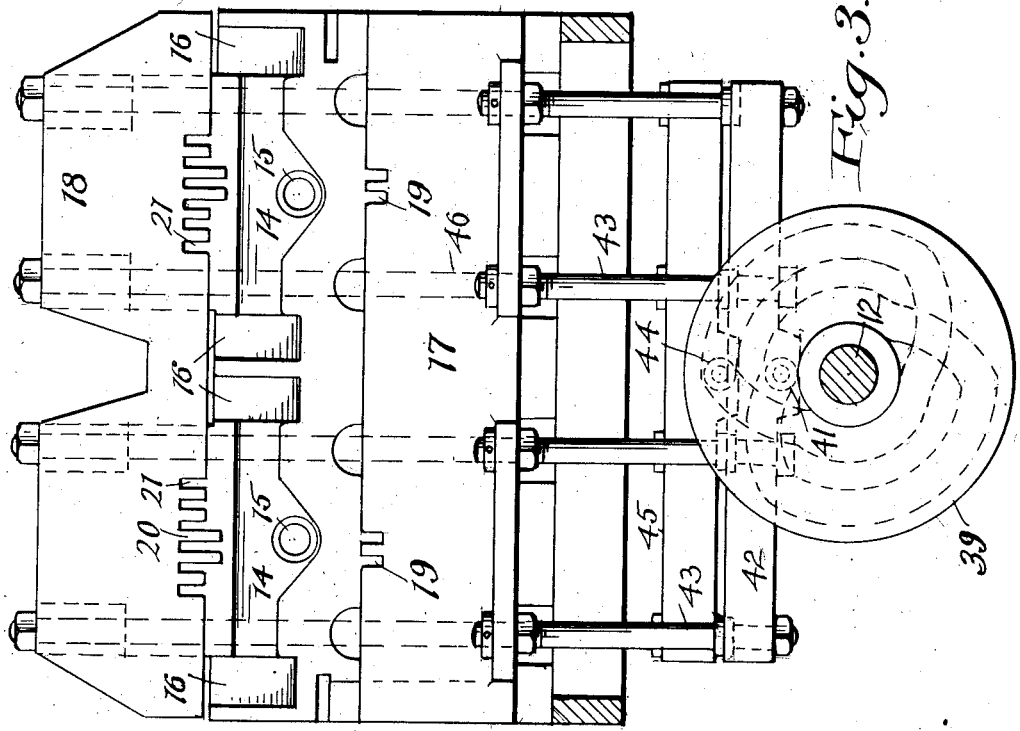
Figure 4:
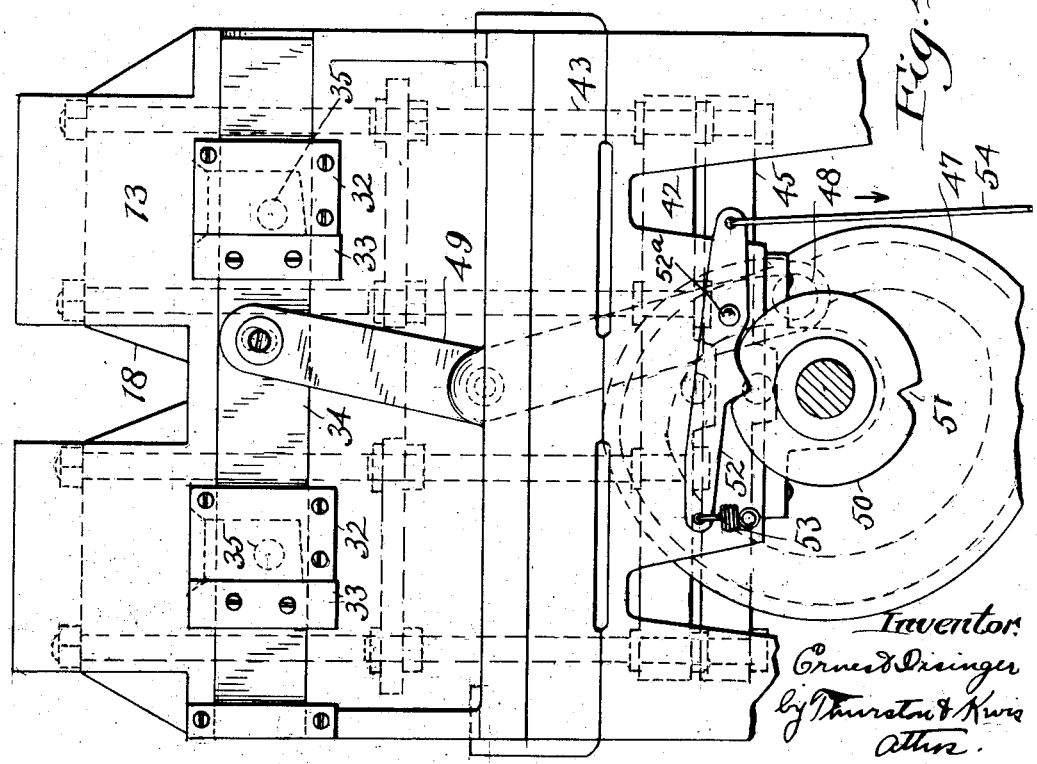
Figure 6:
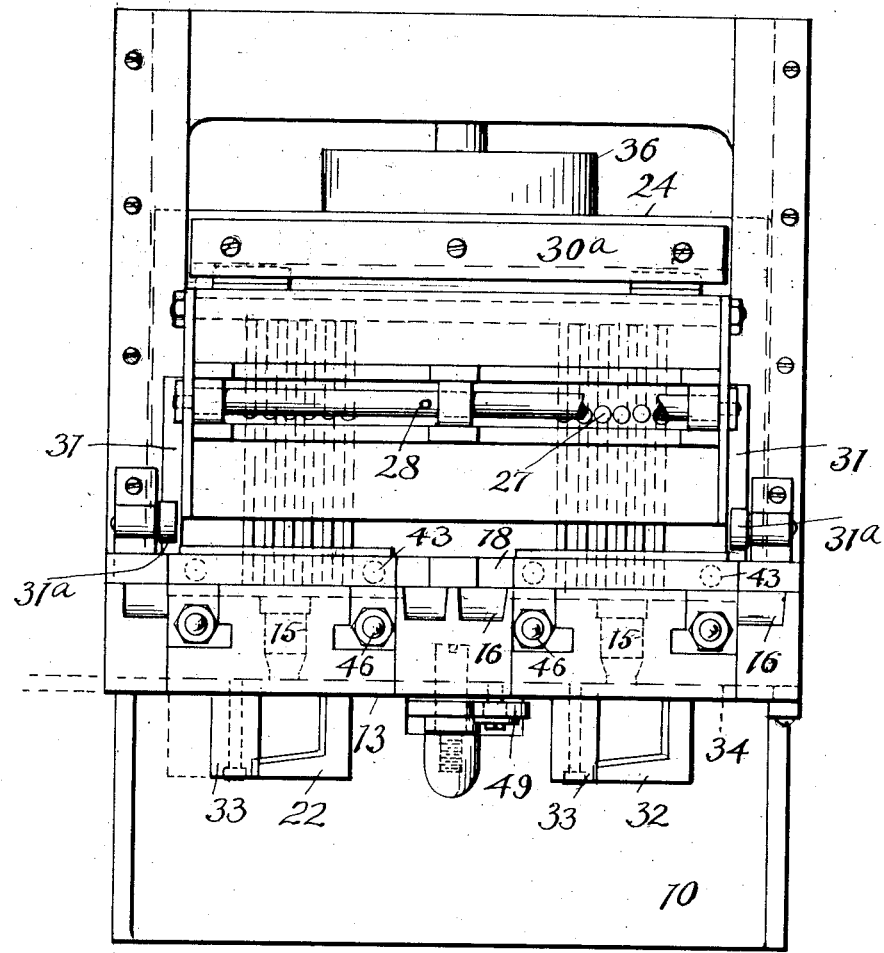
Figure 7:
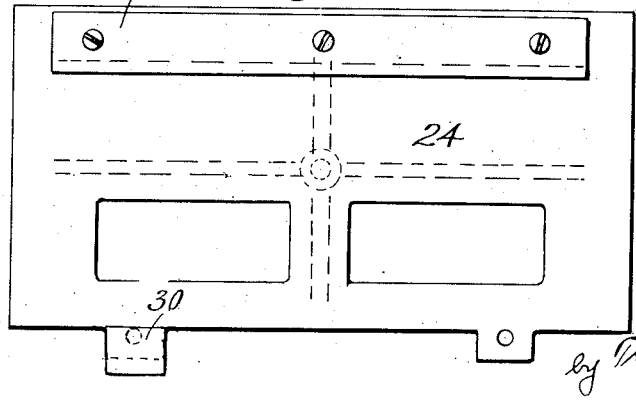

In the accompanying sheets of drawings Figure 1 is a side view of the machine with a magazine loaded with grids in position for casting; Fig. 2 is a central, vertical, sectional view through the same; Fig. 3 is a front view with the magazine removed, and showing the mold open; Fig. 4 is a rear view of the machine with the parts in position for casting; Fig. 5 is a view similar to Fig. 3, with the mold closed; Fig. 6 is a top plan view with the magazine in position for casting; Fig. 7 is a plan view of the slide adapted to support the grid magazine; Fig. 8 is a side view, and Fig. 9 is an end view of a group of battery plates to which a strap and terminal post have been cast by the machine of this application; Fig. 10 is a front view of the grid magazine, parts being broken away; and Fig. 11 is an end view of the same with parts broken away.

The casting machine includes a horizontal bed 10, which supports the stationary and movable parts of the mold, and also the slide for the grid magazine, this table being supported on suitable legs 11, between which extends, in a horizontal direction beneath the table, an operating shaft 12.

In this instance, the mold includes a stationary rear portion containing the mold cavity and two vertical and relatively movable front portions designed to be opened and closed to admit the lugs of one or more groups of storage battery grids, and to permit the removal of the grids after the strap and terminal post casting has been completed. This machine differs also from that disclosed in my prior application, in the respect that in the present machine the magazine and grids are moved horizontally so that the lugs will be inserted in the mold from the front, and the pouring is done from the rear side of the stationary body portion of the mold. As additional features of novelty, the mold is provided at its rear side with pouring gates which can be opened and closed, and with a cutter, which upon the opening of the mold and of the pouring gates, trims off the ends of the terminal posts, and severs from the latter the excess metal or risers in the pouring gates.

With this brief preliminary description, reference is again had to the drawings, from which it will be seen that the mold comprises a rear stationary body portion 13, on the front face of which are mold cavities 14, the shape of which corresponds to the shape of the straps to be cast onto the grids, and extending rearwardly from these mold cavities to the rear wall of the body portion 13 of the mold, are cylindrical openings 15, in which are cast the terminal posts, these openings extending horizontally through to the rear side of the mold. Extending up from the mold cavities 14, are risers 16, into which the excess metal rises during the casting, in the well-known manner. In this instance, as in my prior application, the straps and posts are simultaneously cast onto two sets of battery grids, but it will be understood that in practising my invention, if desired, the machine may be equipped for casting a strap and post onto a single set of grids only.

The front of the mold is composed of two vertically movable parts 17 and 18, which are designed to be moved toward and from each other to open and close the mold, and to form the front wall of the mold cavity 14. It will be observed that the lower front mold section 17, is provided with slots 19, which receive tongues 20, of the upper front mold section 18, so that when the mold is closed, the registering or accurate fitting of the parts is assured. Additionally, the upper front mold section 18 is provided along its lower edge with groups of slots 21, which, when the mold is closed, are properly positioned with respect to the cavities 14, and which are designed to receive the lugs 22 of two groups of storage battery grids 23, supported in a grid magazine (shown detached from the machine in Figs. 10 and 11), which magazine is removably supported on a slide 24, mounted in guideways of the table or bed, and adapted to move the grids horizontally toward and from the mold.

This grid magazine is in the form of a rectangular frame having upper and lower cross-pieces 25 and 25$^a$, provided along their upper and lower edges respectively, with slots 26, which receive the grids, the tongues or fingers between the slots holding the grids predetermined distances apart. It may be stated at this point, that when the grids are moved up to the mold, so that the lugs 22 of the grids enter the slots 21 of the upper front mold section, the fingers or tongues which extend between the slots 21, position the lugs so that the latter are just the right distance apart.

Additionally, the magazine frame is provided on the back or rear wall with a pair of end strips 27, onto which the grids are lowered when they are inserted in the magazine, and it is provided also with means for clamping the grids in position and alining their edges, the means for accomplishing this, being an improvement over that disclosed in my prior application. In this case, the upper cross-member 25, of the magazine, is provided, in alinement with the slots 26, with pins 27, which are designed to pass entirely through the unslotted portion of the member 25 and a short distance into the slots 26. These pins are designed to be moved inwardly so as to engage and penetrate the edges of the grids, and to be moved outwardly away from the grids by an eccentric rod 28, designed to be turned by a handle 28$^a$ and a bar or cross-head 29, which extends the full length of the magazine, as shown by full and dotted lines in Fig. 10, the reduced portions of the pins passing through this cross-head. Small coil springs 29$^a$, are provided around the enlarged portions of the pins, and are located between the cross-head 29 and shoulders on the pins. These coil springs between the cross-head and the pins admit of inequalities in the dimensions of the grids, that is to say, if some of the grids are wider than others, some of the small coil springs may be compressed more than others, thus permitting all the pins to be moved proper amounts to engage and penetrate the edges of the grids.

The magazine when loaded, is placed on the forwardly and rearwardly movable slide 24, which is provided with front and rear abutments 30 and 30$^a$, against which the lower front and rear edges of the magazine bear. The latter is provided at its ends with guide-bars 31, which are engaged by rollers 31$^a$, carried by brackets on the frame, so that the magazine is accurately positioned with reference to the mold cavities.

As before stated, the portions 15 of the mold cavities which form the terminal posts, extend through the stationary rear part 13 of the mold. At the outer, rear ends of the post forming openings 15, and on the rear side of the rear stationary mold member 13, are two pouring gates, each of which, as will be seen particularly by reference to Fig. 4, consists of a main stationary part 32, and a movable part 33. The parts 32 of the gates are secured to the body portion 13 of the mold, and the movable parts 33 are movable laterally toward and from the parts 32. In this case, the movable parts 33 are carried by a horizontally movable slide 34, this slide being movable in a slot formed on the rear face of the stationary body portion 13 of the mold, and passing through the parts 32 of the two gates, the slide being actuated (in the manner hereinafter described) so that it closes the gates at, or about the time the mold is closed, and opens the gates when the mold is opened. This slide is provided with two openings 35, which register with the post forming mold cavities 15, when the gates are closed and the parts are in position for pouring, so that the metal which is poured into the gates may pass through the slide into the mold cavities.

Not only does this slide 34 serve to open and close the gates, but when the gates are opened by the movement of the slide to the left, as the same is viewed in Fig. 4, the slide severs the risers, or metal remaining in the pouring gates from the ends of the posts cast onto the plates with the straps, the portions of the slide immediately surrounding the opening being formed with a suitable cutting edge, so that the posts can be severed from the risers in the pouring gates, neatly and easily. By thus trimming off the posts and severing the risers therefrom, the groups of plates, with the straps and posts cast thereto, can be removed from the front part of the mold, and the risers in the pouring gates can be readily lifted from the latter as soon as the gates are opened.

For the purpose of operating the principal parts of the machine including the slide carrying the magazine, the movable parts of the mold, the pouring gates and cutter, I provide on the operating shaft 12, a plurality of cams including a cylindrical cam 36, having on its periphery a cam slot which is engaged by a roller 37, carried at the lower end of a downward extension 38, on the magazine slide 24. The cams for operating the parts 17 and 18 of the mold are shown at 39 and 40, both being in the form of disks having cam slots on their flat faces. The cam slot of disk 39 is engaged by a roller 41, carried by a vertically movable cross-head 42, connected by bolts or studs 43, to the lower front mold member 17. The cam slot of cam 40 is engaged by a roller 44, carried by a vertically movable cross-head 45, which is connected by bolts or studs 46, to the upper front mold member 18. A cam 47 is mounted on the shaft, just at the rear of cam 40, for the purpose of operating the pouring gates and the cutter. This cam has on one of its side faces a slot which is engaged by a roller 48, carried at the lower end of a lever 49, pivoted about midway between its ends on the bed or table 10, and connected at its upper end to about the middle point of the slide 34, as shown clearly in Fig. 4.

The shaft 12, is also provided, preferably, but not necessarily, with a releasing disk or cam 50, having a pair of diametrically opposite, peripheral notches 51 (see Fig. 4) which are adapted to be engaged by the nose of a pawl 52, which is pivoted at 52ª on the stationary part of the machine, and at one end is pulled yieldingly toward the disk 50 by a spring 53. The opposite end of the lever is connected to a releasing rod 54, which is preferably connected at its lower end with a pedal (not shown) which is adapted to be depressed by the operator to enable the parts of the machine to be operated. The construction is such that when the pedal is depressed and the rod 54 is pulled downward, the nose of the pawl 52 will be lifted from one of the notches 51, since the pivot point 52ª of the lever is between the nose of the pawl and the point of attachment of the rod 54. When the pawl 52, is lifted from the controlling or locking disk 50, the shaft 12, may be turned through a half revolution, after which the pawl will drop into the other notch, thus holding the parts against further movement until the pawl is again lifted.

Normally, that is to say, before the two groups of grids are placed in the machine to have the straps and posts cast thereon, the magazine slide 24 will be in its forward position, in other words, moved forwardly away from the mold, and the mold will be wide open, and both pouring gates will be open. The operator will then place on the magazine slide 24, the magazine which has been previousy filled or loaded with the grids; thence the operator will depress the pedal which shifts the pawl or lever 52 from the notch in the disk 50, and by hand, or by power, will turn the shaft 12. The parts are so related, and the cams are so timed, that in turning the shaft through a half revolution, the magazine slide is moved forwardly toward the mold, so that the lugs 22 on the grids enter the mold cavities; thence the mold is closed by the upward movement of the lower front mold member 17, and the simultaneous downward movement of the upper front mold member 18. At, or substantially at the same time that the mold is closed, the slide 34 is shifted laterally, closing both pouring gates and bringing the openings 35 in the slide, in registration with the mold cavities 15.

The molten metal, which is generally lead, is then poured from a suitable ladle into the pouring gates, the metal passing from the gates through the slide 34, into the mold cavities, thus casting the straps onto the grids, and the terminal posts onto the straps. The mold is allowed to remain closed for a sufficient length of time to permit the metal to harden, after which the operator will again lift the pawl or releasing lever 52, from the disk 50, and turn the shaft 12 through another half revolution, and during this movement of the shaft the pouring gates are opened, the risers in the pouring gates are severed from the posts by the slide or cutter 34, the mold is opened, and immediately after the opening of the mold, the magazine slide is moved forwardly or away from the mold, carrying the battery grids with their now cast on straps and posts, out of the mold cavities. The magazine will now be lifted from the magazine slide, after which another loaded magazine will be placed on the slide, and the operation will be repeated.

In Figs. 8 and 9 I have shown a set of the grids 23, to the lugs 22 of which, is cast one of the straps here designated 55, and a terminal post 56, the end of which has been trimmed off or severed from the riser, by the cutting slide 34.

In the machine wherein the casting is carried on in duplicate, that is, wherein the straps and posts are cast simultaneously on two sets of the grids, the straps 55 of the two sets will be joined. After the grids are removed from the magazine the straps will be separated and the risers 16 will be trimmed off of the straps.

Having thus described my invention, what I claim is:

1. In a machine for casting straps to a group of storage battery grids, a mold composed of a stationary portion and a relatively movable portion, whereby the mold may be opened and closed, said mold having at one side means for receiving lugs on the grids, and having at the opposite side a pouring gate.

2. In a machine for casting a strap onto a series of storage battery grids, a mold provided with a stationary body portion having a mold cavity extending from side to side thereof, and provided at one side with means for receiving projecting portions on the grids and at the opposite side with a pouring gate.

3. In a machine for casting a strap onto a series of storage battery grids, a mold provided with a stationary body portion having a mold cavity extending from side to side thereof, said mold having at one side, relatively movable closing and opening parts provided with means for receiving projecting portions on the grids and at the opposite side having a pouring gate.

4. In a machine for casting straps onto groups of storage battery grids, a mold provided at one side with relatively movable opening and closing members having means for receiving the projecting ends or lugs on the grids, and provided on the opposite side with a pouring gate composed of relatively movable parts.

5. In a casting machine, a mold having at one side means for receiving lugs or projecting portions on elements to which a member is to be cast, and at the opposite side having a pouring gate, and a cutter for severing from the casting made in the mold, the riser or metal extending into the pouring gate.

6. In a casting machine, a mold having at one side means for receiving lugs or projecting portions on a series of elements to which a member is to be cast and at the opposite side having a pouring gate composed of relatively movable parts, and a cutter for severing from the casting made in the mold, the riser or metal extending into the pouring gate, said cutter and one of the parts of the gate moving simultaneously.

7. In a casting machine, a mold having means for receiving lugs or projecting portions on a series of spaced elements on which a member is to be cast and having a pouring gate, and a cutter for severing from the casting made in the mold, the riser or metal extending into the pouring gate, said cutter having an opening adapted to register with the mold cavity in the mold.

8. In a casting machine, a mold having means for receiving lugs or projecting portions on a series of spaced elements on which a member is to be cast and having a pouring gate composed of relatively movable parts, and a cutter for severing from the casting made in the mold, the riser or metal extending into the pouring gate, said cutter carrying a movable part of the gate.

9. In a casting machine, a mold having means for receiving lugs or projecting portions on a series of spaced grids or other elements on which a member is to be cast and having a pouring gate composed of relatively movable parts, and a cutter for severing from the casting made in the mold, the riser or metal extending into the pouring gate, said cutter being in the form of a slide carrying one of the parts of the gate.

10. In a machine for casting straps onto groups of storage battery grids, a mold composed of a main or body portion having a mold cavity and provided at one side with a pair of relatively movable mold closing and opening parts both movable with reference to the body portion of the mold and provided with means for receiving lugs or projecting portions on a group of grids, a magazine containing a group of grids, and means for moving the same toward and from the mold, said mold cavity extending through said main or body portion of the mold, and the latter having a pouring gate on the side opposite to the mold opening and closing parts.

11. In a machine for casting straps onto groups of storage battery grids, a mold comprising a stationary body or main portion having a mold cavity and provided at one side with relatively movable mold opening and closing parts through which lugs or projections on the grids may extend into the cavity, a laterally movable carrier for a grid magazine, and means for successively moving the carrier toward the mold and for closing the same.

12. In a machine for casting straps onto groups of storage battery grids, a mold having relatively movable mold closing and opening parts, a laterally movable carrier for a grid magazine adapted to move toward and from the mold, a pouring gate having a movable part, and mechanism for shifting the grid carrier, for shifting the parts for opening and closing the mold, and for shifting the movable part of the gate.

13. In a machine for casting straps onto groups of storage battery grids, a mold having a body portion with a cavity extending therethrough, relatively movable mold closing and opening parts at one side of the body portion, a laterally movable carrier for a grid magazine movable toward and from said parts, a pouring gate on the opposite side of said body portion, a cutter for cutting from the casting the metal in the gate, and mechanism for operating in predetermined time relationship, the carrier, the mold opening and closing parts, and the cutter.

14. In a machine for casting straps onto groups of storage battery grids, a mold having a body portion with a cavity extending therethrough, relatively movable mold closing and opening parts at one side of the body portion, a laterally movable carrier for a grid magazine movable toward and from said parts, a pouring gate on the opposite side of said body portion and having a movable member, a cutter for cutting from the casting the metal in the gate, and mechanism for operating in predetermined time relationship, the carrier, the mold opening and closing parts, the movable part of the gate and the cutter.

15. In a machine for casting a strap and a terminal post onto a group of spaced storage battery grids, a mold provided at one side with means for receiving lugs on the group of grids, and provided with a mold cavity including a portion for forming the strap and a portion at right angles thereto for forming the post, said last-named portion extending from one side of the mold substantially through to the opposite side, and means at said opposite side for receiving the molten metal.

16. In a machine for casting a strap and a terminal post onto a group of spaced storage battery grids, a mold provided at one side with means for receiving lugs on the group of grids, and provided with a mold cavity including a portion for forming the strap and a portion at right angles thereto for forming the post, said last-named portion extending from one side of the mold substantially through to the opposite side, and a pouring gate at said opposite side communicating with the end of said last-named portion of the mold cavity.

17. In a machine for casting a strap and a terminal post onto a group of spaced storage battery grids, a mold provided at one side with means for receiving lugs on the group of grids, and provided with a mold cavity including a portion for forming the strap and a portion at right angles thereto for forming the post, said last-named portion extending from one side of the mold substantially through to the opposite side, and means at said opposite side of the mold for trimming off the end of the metal forming the post.

18. In a machine for casting a strap onto a series of storage battery grids, a mold having an opening adapted to receive a portion of each grid, and a grid magazine adapted to hold a group of grids, said magazine having a receptacle into which the grids may be inserted and provided with pins adapted to be depressed to engage the edge portions of the grids.

19. In a machine for casting straps onto a series of storage battery grids, a mold adapted to receive portions of the grids, and a grid magazine adapted to hold a group of grids, said magazine having a receptacle into which the grids may be inserted and provided with pins adapted to be depressed to engage the edge portions of the grids, and means for simultaneously shifting the pins.

20. In a machine for casting straps onto a series of storage battery grids, a mold having an opening adapted to receive a portion of each grid, and a grid magazine adapted to hold a group of grids, said magazine having a receptacle into which the grids may be inserted and provided with pins adapted to be depressed to engage the edge portions of the grids, and means comprising an eccentric shaft for simultaneously depressing the pins.

21. In a casting machine, a mold having means for receiving lugs or projecting portions on elements to which a member is to be cast, and having a pouring gate composed of relatively movable parts, a cutter for severing from the casting made in the mold the riser or metal extending into the pouring gate, and means whereby the cutter and one of the parts of the pouring gate operate simultaneously.

In testimony whereof, I hereunto affix my signature.

ERNEST DISINGER.